(12) United States Patent
Chess et al.

(10) Patent No.: US 6,711,583 B2
(45) Date of Patent: Mar. 23, 2004

(54) SYSTEM AND METHOD FOR DETECTING AND REPAIRING DOCUMENT-INFECTING VIRUSES USING DYNAMIC HEURISTICS

(75) Inventors: David Michael Chess, Mohegan Lake, NY (US); Richard Ford, Boca Raton, FL (US); Jeffrey Owen Kephart, Cortlandt Manor, NY (US); Morton Gregory Swimmer, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 09/163,250

(22) Filed: Sep. 30, 1998

(65) Prior Publication Data

US 2002/0073055 A1 Jun. 13, 2002

(51) Int. Cl.[7] .................................................. G06F 7/00
(52) U.S. Cl. .................... 707/104.1; 715/523; 715/524; 715/526; 714/38
(58) Field of Search ................................ 707/524, 526, 707/523, 104.1; 714/38; 715/523–526

(56) References Cited

U.S. PATENT DOCUMENTS

| | | | | |
|---|---|---|---|---|
| 5,414,650 A | * | 5/1995 | Hekhuis | |
| 5,452,442 A | * | 9/1995 | Kephart | |
| 5,472,529 A | * | 12/1995 | Arita et al. | ..................... 149/2 |
| 5,606,609 A | * | 2/1997 | Houser et al. | |
| 5,613,002 A | * | 3/1997 | Kephart et al. | |
| 5,696,822 A | * | 12/1997 | Nachenberg | |
| 5,978,917 A | * | 11/1999 | Chi | ............................ 713/201 |
| 6,016,546 A | * | 1/2000 | Kephart et al. | ............. 713/200 |
| 6,219,818 B1 | * | 4/2001 | Freivald et al. | ............. 714/799 |
| 6,357,008 B1 | * | 3/2002 | Nachenberg | |

OTHER PUBLICATIONS

Jay Milne, Network Computing, Sep. 15, 1998, NWC, Sneak Previews.*

* cited by examiner

*Primary Examiner*—Kim Vu
*Assistant Examiner*—Hung Pham
(74) *Attorney, Agent, or Firm*—Scully, Scott, Murphy & Presser; Gail H. Zarick, Esq.

(57) ABSTRACT

A method for detecting document-infecting computer viruses in a computer system having a plurality of documents, comprises the steps of maintaining a database of information associated with program objects associated with one or more of the documents, comparing one or more of the documents on the system with corresponding database entries in the database to detect certain document changes, and using a set of criteria to determine whether or not the detected document changes are likely to have been caused by viral activity.

69 Claims, 5 Drawing Sheets

SYSTEM AND METHOD FOR DETECTING AND REPAIRING DOCUMENT-INFECTING VIRUSES USING DYNAMIC HEURISTICS

FIELD OF INVENTION

The present invention relates to the field of computer viruses. More specifically, the present invention is directed to a system and method for detecting document-infecting viruses using dynamic heuristics.

BACKGROUND

Computer viruses that infect documents, such as word-processing documents, spreadsheets, slide presentations or other office documents that have discrete program objects (e.g., macros or other programs) attached thereto or embedded therein are a significant problem for computer users. While current virus detection and repair technology satisfactorily detects documents infected by known viruses, new (as yet unknown) viruses appear every day. Thus, methods are needed to automatically detect these new viruses that have never been seen before rather than waiting for the virus to be identified and incorporated into a database of known viruses. Methods presently exist to detect and repair new program-infecting and boot-infecting viruses, but many of these methods cannot be applied to document-infecting viruses. Furthermore, the subset of these methods that can be applied to document-infecting viruses falls short of providing an adequate solution.

Some existing anti-virus programs use static heuristics to detect and repair infected documents. Static heuristics use only the current state of a document in detection and disinfection. While static heuristics are effective in some cases, they are prone to false positives, false negatives and incorrect repair. Using dynamic information about changes to documents, rather than merely the current state of the document, can help reduce these problems.

Dynamic heuristics are rules that use descriptions of changes to a system to estimate the probability that the system is in a certain state. Some existing anti-virus programs use dynamic heuristics to detect and repair files infected by machine-language viruses that infect existing programs. Because they assume that an infected program is an essentially homogenous stream of bytes (some viral and some representing the original program) and because they operate on only a single program at a time, these anti-virus programs cannot be applied to document-infecting viruses. Heuristics for program-infecting viruses assume that the original object is itself a program, and that any reversible change that occurs in that program is likely to be viral. In the case of document-infecting viruses, the infected object is a data file which, initially, may not contain any programs at all, and the fact that new content has been added to a document is not itself strong evidence of infection.

Therefore, new methods are needed to detect and disinfect these document-infecting viruses using dynamic heuristics.

SUMMARY OF THE INVENTION

The present invention uses dynamic heuristics to detect and repair documents that are infected by computer viruses. Specifically, the present invention includes a system and method for detecting document-infecting computer viruses in a computer system having a plurality of documents, the method including the steps of maintaining a database of information pertaining to program objects associated with one or more of the documents, comparing one or more of the documents on the system with corresponding database entries in the database to detect certain document changes, and using a set of criteria to determine whether or not the detected document changes are likely to have been caused by viral activity. Preferably, the program objects include macros or programs.

The maintaining step may include the step of maintaining a database of information about whether or not each of the documents contains any program objects, the step of maintaining a database of information about each of the documents including the name of each program object contained in each of the documents, the step of maintaining a database of information about each of the documents including a number of the program objects contained in each of the documents, the step of maintaining a database of information about each of the documents including a combined total length of the program objects contained in each of the documents, the step of maintaining a database of information about each of the documents including a length of each program object contained in each of the documents, the step of maintaining a database of information about each of the documents including a CRC or other checksum of each program object contained in each of the documents, or the step of maintaining actual content of each program object located in each document.

The information pertaining to each program object preferably includes a transformation of its actual content that is likely to be invariant or insensitive to typical types of polymorphism.

In another embodiment, the information pertaining to each program object is selected to reflect a basic operation of the program object and to ignore details that are likely to change in the basic operation. Preferably, the ignored details include comments, formatting and/or identifiers. The information selected to reflect a basic operation of the program object can also be a program dependency graph.

The comparing step may include the step of periodically comparing, at some timed interval, one or more of the documents on the system with corresponding database entries to determine what changes have occurred since a last examination. It may alternatively include the step of comparing, in response to an event, to determine what changes have occurred in the recent past. The event may include receipt of a user input, every occurrence of a document changing, every Nth occurrence of a document changing, for some value of N, or an Nth occurrence of any document changing, for some value of N. Finally, the comparing step may include the step of comparing each of the one or more documents with corresponding database entries to detect added program objects.

The using step may include the step of determining one or more sets of program objects which are suspected of being viral. This may be accomplished by finding a positive maximum set of program object names which have been added to a number of documents.

The method preferably includes the additional steps of warning a user of the document changes; and receiving a message from the user indicating action to be taken.

The set of criteria may include whether more than a predetermined minimum number of documents have changed from having no program objects to having some program objects or whether more than a predetermined minimum number of documents have had the same number of units of active content added to them.

The maintaining step may include the step of maintaining a database of information about each of the documents sufficient to determine which program objects are new, and wherein the set of criteria includes whether more than a predetermined minimum number of documents have had new units of active content with the same name added to them.

The method of the present invention preferably includes the additional step of restoring, for certain types of document changes, the changed documents to their original condition or to a functionally equivalent state. The restoring step preferably includes the step of removing all program objects from documents that previously contained none, the step of removing all program objects that were not previously present, according to the information stored in the database, and/or the step of removing from each changed document any and all program objects that are suspected of being viral, in response to the using step.

The method of the present invention preferably includes the additional step of updating the database where any of the one or more documents does not have a corresponding database entry or the additional step of recording, in the database, any new program object which has been added to any of the documents.

The method of the present invention preferably further includes the step of recording, in the database, only those changes to documents which are judged not to be possibly viral in nature, so that future executions of the method will detect the other changes again and again consider whether or not they represent viral changes, in the light of other changes that have occurred since. It also can include the step of recording, in an additional database, information about recent program changes and utilizing, in the using step, the information in addition to any changes detected in a current run.

Another aspect of the present invention is a program storage device, readable by a machine, tangibly embodying a program of instructions executable by the machine to perform the method steps for detecting document-infecting computer viruses in a computer system as described hereinabove.

Finally, another aspect of the present invention is a system for detecting document-infecting computer viruses in a computer system having a plurality of documents, the system including a device for maintaining a database of information pertaining to program objects associated with one or more of the documents, a device for comparing one or more of the documents on the system with corresponding database entries in the database to detect certain document changes, and a device for using a set of criteria to determine whether or not the detected document changes are likely to have been caused by viral activity.

BRIEF DESCRIPTION OF THE DRAWING

The present invention will be understood by reference to the drawing, wherein.

DETAILED DESCRIPTION OF THE PREFERRED EMBODIMENT

Figure 1:
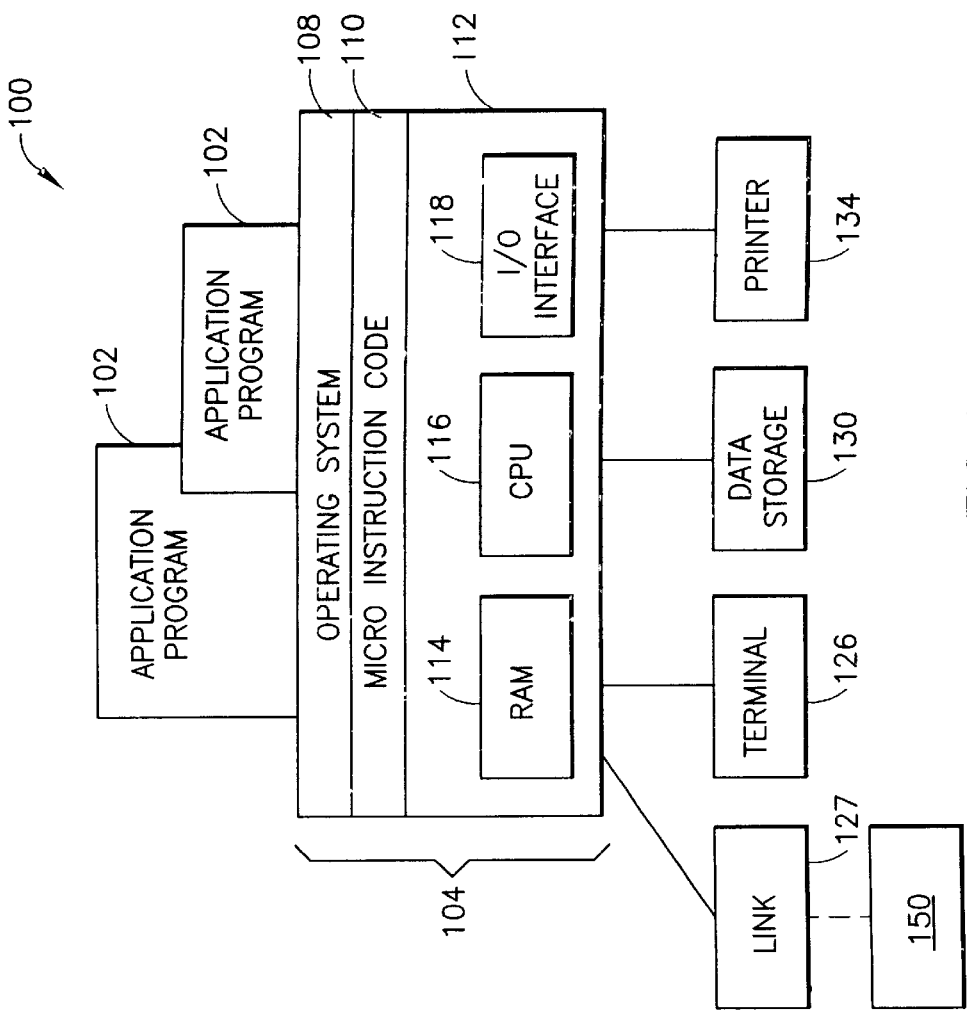
FIG. 1 is a block diagram of a computer system on which a preferred embodiment of the present invention operates.

FIG. 1 is a block diagram showing a computer system 100 on which a preferred embodiment of the present invention operates. The preferred embodiment includes one or more application programs 102, one of which incorporates the method shown in FIGS. 3A, 3B and 3C. The application programs 102 operate on a computer platform 104 that includes a hardware unit 112. The hardware unit 112 includes one or more central processing units (CPUs) 116, a random access memory (RAM) 114 and an input/output interface 118. Micro instruction code 110, for instance a reduced instruction set, may also be included on the platform 104. Various peripheral components may be connected to the computer platform 104 including a terminal 126, a data storage device 130 and a printing device 134. A link 127 may also be included to connect the system 100 to one or more other similar systems 150. The link 127 is used to transmit digital information between the computers 100 and 150. An operating system 108 coordinates the operation of the various components of the computer system 100. An example of computer system 100 is the IBM IntelliStation (IntelliStation is a trademark of the IBM Corporation). It is readily understood that those skilled in the art will be familiar with many equivalent computer systems 100.

Figure 2:
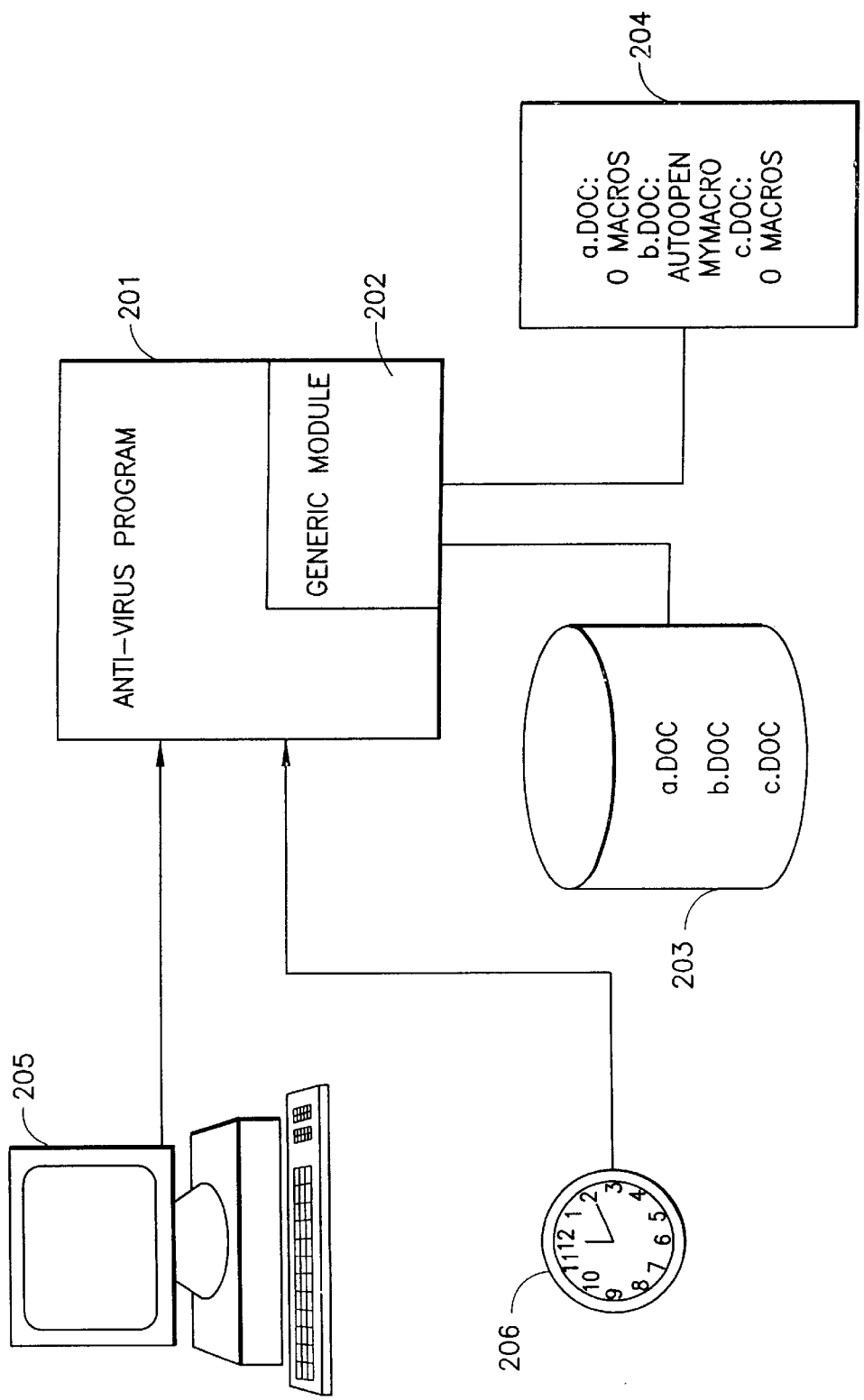
FIG. 2 is a block diagram of a preferred embodiment of the present invention.

In a preferred embodiment of this invention, an anti-virus program 201 contains a generic document-virus detection and repair module 202 which has access to both a collection of documents stored on disk 203 and a database of document information 204, which preferably is located on disk as well. This database may be maintained solely by the generic module 202, or it may be a database that the anti-virus program 201, as a whole, maintains for various purposes. In any case, the database 204 contains, for each document in the collection, the name of the document and data pertaining to any program objects such as macros, programs or other units of active content (hereinafter "macros") contained in the document. Specifically, the database 204 could contain data pertaining to all of the macros (such as the number of macros contained in each document and the total length of all the macros in each document) and/or data pertaining to each individual macro (such as its name (FIG. 2), its length, a CRC or other checksum of its body, or a copy of its actual content. Because some macro viruses are polymorphic (i.e. they change as they travel to avoid detection), a further embodiment of the present invention would record, in the database 204, a transformation of the macro's content that is likely to be invariant or insensitive to typical types of polymorphism. For example, the macro information maintained in the database 204 can be limited to basic or essential operations. This can be achieved, for example, by ignoring any comments, formatting, identifiers or exact strings used for, e.g., variable names which are items that polymorphic macro viruses are likely to change. In a second example of such a transformation, the database 204 would record a program dependency graph or other functional representation of each macro. In a third example, the database 204 would record an XOR-invariant of the macro contents, computed by XORing together successive bytes of the macro body (see U.S. Pat. No. 5,442,699, issued to Arnold et. al. on Aug. 15, 1995 and hereby incorporated by reference). For purposes of minimizing storage requirements, a checksum of the result of any or all of these invariant transformations may be recorded in lieu of the result itself When the anti-virus program 201 begins a scan of the system 100, either in response to user input from, for example, a terminal 205 or due to the expiration of a, preferably periodic, timer 206, the anti-virus program 201 invokes the generic document-virus detection and repair module 202. Alternatively, the scan can be initiated in response to a document changing event such as each occurrence of a document changing, an Nth occurrence of a document changing (where N is some positive integer value) or a certain number of documents having changed.

Figure 3A:
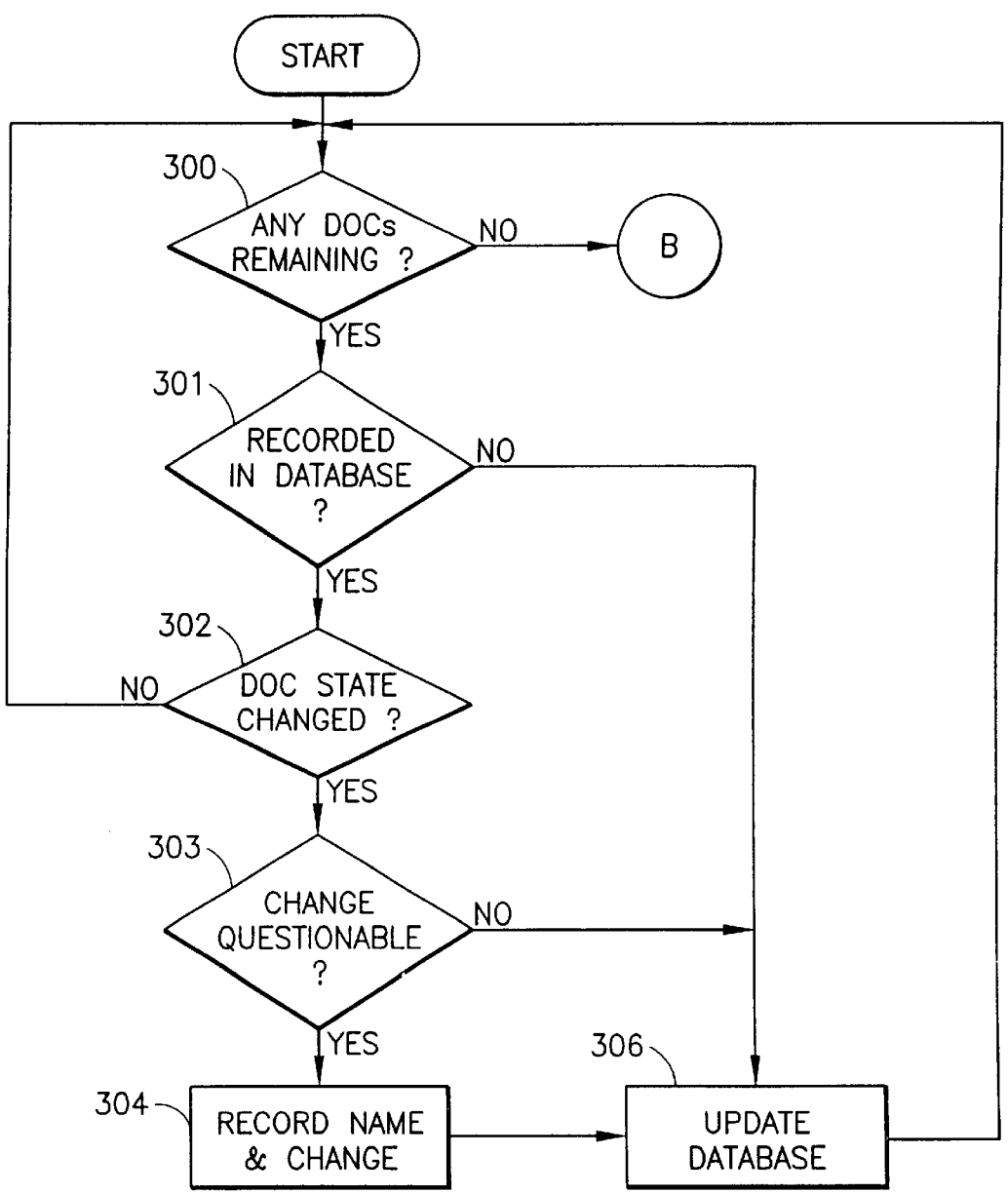
FIGS. 3A, 3B and 3C are flow diagrams of a method according to a preferred embodiment of the present invention.

FIG. 3A illustrates a method according to the present invention preferably embodied within the generic module 202. When invoked, the generic module 202, preferably, examines each of the documents in the collection on disk 203. This system can be modified so that one or more of the documents is examined. In step 300, the module 202 determines whether there are any documents remaining within the collection. For each document determined to be remaining, the generic module 202 determines the name of the document and computes pertinent data for the macros contained therein. It then consults the database 204 to determine the previous state of the document. If, in step 301, it is determined that the document was not previously recorded in the database, the database is updated, in step 306, to include the document name and macro data, including, e.g., the names of any macros contained therein. Otherwise, if the document was previously stored in the database, control passes to step 302, where the system computes the macro data for the document and compares it with the macro data previously recorded in the database for that document. On the basis of that comparison, the system determines whether the state of the document as reflected in the database has changed. If, in step 302, it is determined that the macro data for the document are unchanged from what was previously recorded in the database, the document is bypassed and the method continues in step 300. If it is determined, in step 302, that the document's state has changed, the system then determines, in step 303, whether the change is to be regarded as a "safe" change or a "questionable" change. By example, changes which consist only of removing one or more macros from the document could be considered "safe", whereas the modification or addition of macros to the document could be considered "questionable".

If the changes are determined to be "safe," then, in step 306, the document's record in the database is replaced with the new data computed in step 302, and control passes back to step 300. If the changes are determined to be "questionable," a record is made of the name of the document and of the nature of the change (e.g., the names of the added macros), in step 304. Then the database is updated in step 306. After each database update, the method continues in step 300.

Figure 3B:
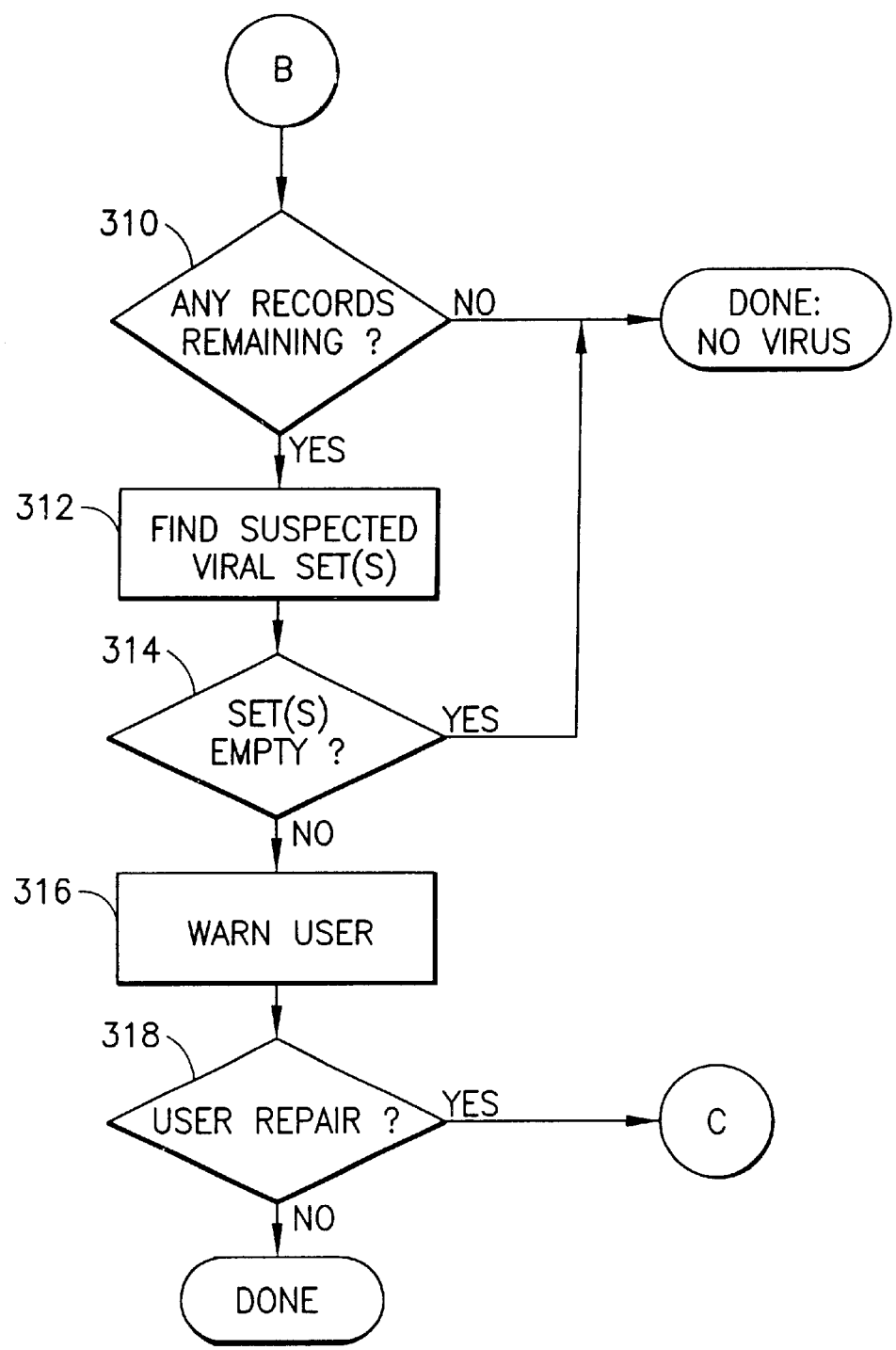

If, in step 300, the system determines that there are no documents remaining to be reviewed in the database 204, the method continues in FIG. 3B. When the generic module 202 has finished examining all the documents in the collection, it then examines the records generated in step 304, if any. In step 310, the system determines whether there are any such records to be examined. If no records were made, the generic module 202 has not detected a virus and it returns with no action. If one or more records were made, the module 202 determines whether viral activity is suspected in any set(s) of documents by, e.g. calculating the largest set of macro names that were added to at least a predetermined minimum number of documents, in step 312. The minimum number is preferably adjustable by the user but, by default, is preferably equal to four.

In alternate embodiments of this invention, other heuristics may be used by the module 202 to identify "viral sets" i.e, common sets of macros that are likely to be or suspected of being viral. One heuristic is to identify the largest set or sets of macro names that were added to at least the predetermined number of documents. This can be done by standard optimization techniques known to those skilled in the art. Alternatively, the module 202 can be designed to determine the set of macro names for which the number of documents to which all the macros in the set have been added is maximized. A simple variation that can be applied to both techniques includes an additional preprocessing step prior to the optimization step, in which macros appearing in different documents are compared using any or all pertinent macro data (in addition to or instead of the macro name) to determine whether they are to be regarded as the same or different macros, and/or whether or not they appear likely on static grounds to be part of a viral set. Other possible heuristics will be obvious to those skilled in the art.

After the viral set or sets have been established in step 312, control passes to step 314, in which the system determines whether there are any viral sets containing one or more macros. If there are no such viral sets, e.g., the set of names is empty, the module 202 returns with no action. Otherwise, if that set of names (viral set(s)) is not empty, the module concludes that, for each such viral set, a virus consisting of a set of macros with these names (or the macros in that set) may have infected the system and the user is informed and asked if repair should be carried out in step 316. If, in step 318, a message is received indicating that the user replied in the affirmative, the method continues in FIG. 3C. If, however, the user does not request a repair, the method ends.

Figure 3C:
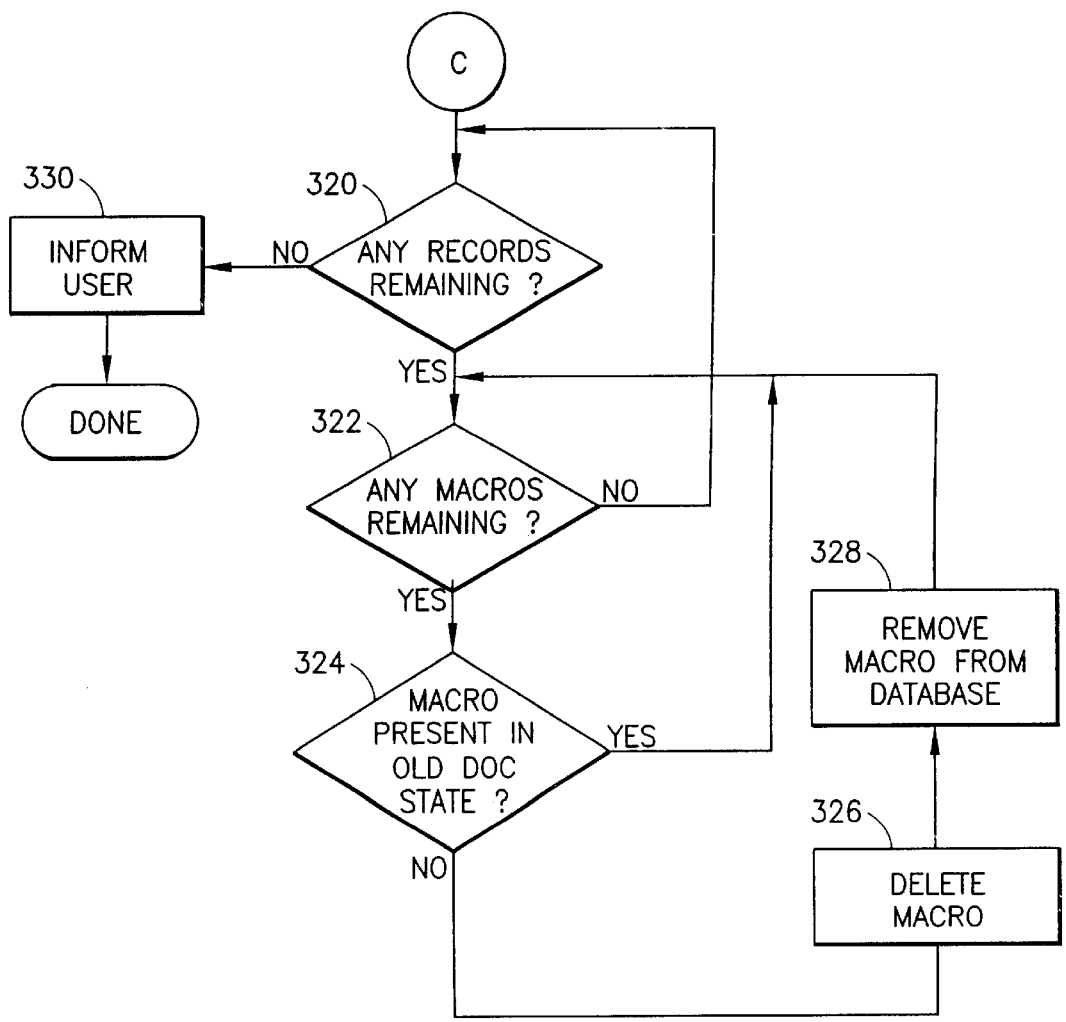

In FIG. 3C, the method of generic module 202 finds all the documents that had macros from one or more viral sets, e.g., with the identified set of names, added to them and restores the changed documents to their original condition or to a functionally equivalent state. In step 320, the system determines if any records remain to be examined. If there are remaining records, the system determines, in step 322, whether there are any further macros in the record's document. If not, the method continues in step 320. If there are macros in the document, the system determines, in step 324, whether the macro was present in the previous (old) state of the document. If so, the method continues in step 322. If not, the macro that was added since the last database entry was made is removed in step 326. Alternatively, the module 202 could remove all macros from documents which previously contained none, or remove all and only macros that belong to one or more viral sets. The document's database information is then updated in step 328. When all such documents have been processed, the user is informed of which macros were removed from which documents in step 330 and the generic module returns control to the main anti-virus program 201.

Now that the invention has been described by way of a preferred embodiment, various modifications and improvements will occur to those of skill in the art. For example, the program can alternatively be designed to alert the user of possible viral activity when documents are determined to contain program objects where, before, they had contained none. In another possible embodiment, the alert will occur when a predetermined minimum number of documents have each had the same number of program objects added to them. In another embodiment, the alert could occur when program object names common to a set of documents are among a set of new objects found. In still another embodiment, the database could be updated to reflect only "safe" changes, allowing "questionable" changes to remain unrecorded, for checking again at a future time. Finally, in yet another embodiment, the records of which documents have been changed in a "questionable" way, and the nature of those changes, could be maintained in an additional database, persisting across executions of the module, to allow the information to be used over a still longer time period. Thus, it should be understood that the preferred embodiment is provided as an example and not as a limitation. The scope of the invention is defined by the appended claims.

We claim:

1. A method for detecting document-infecting computer viruses by utilizing dynamic heuristics in a computer system having a plurality of documents, the method comprising the steps of:

maintaining a database of information pertaining to program objects associated with one or more of the documents;

comparing associated program object information of each of the documents on the system with corresponding program object information maintained in database entries in the database to detect certain document changes; and using a set of dynamic heuristic criteria to determine whether or not the detected document changes are likely to have been caused by viral activity.

2. The method of claim 1 wherein the program objects include macros or programs.

3. The method of claim 1 wherein the maintaining step comprises the step of maintaining a database of information about whether or not each of the documents contains any program objects.

4. The method of claim 1 wherein the maintaining step comprises the step of maintaining a database of information about each of the documents including the name of each program object contained in each of the documents.

5. The method of claim 1 wherein the maintaining step comprises the step of maintaining a database of information about each of the documents including a number of the program objects contained in each of the documents.

6. The method of claim 1 wherein the maintaining step comprises the step of maintaining a database of information about each of the documents including a combined total length of the program objects contained in each of the documents.

7. The method of claim 1 wherein the maintaining step comprises the step of maintaining a database of information about each of the documents including a length of each program object contained in each of the documents.

8. The method of claim 1 wherein the maintaining step comprises the step of maintaining a database of information about each of the documents including a CRC or other checksum of each program object contained in each of the documents.

9. The method of claim 1 wherein the maintaining step comprises the step of maintaining actual content of each program object located in each document.

10. The method of claim 1 wherein the information pertaining to each program object includes a transformation of its actual content that is likely to be invariant or insensitive to typical types of polymorphism.

11. The method of claim 1 wherein the information pertaining to each program object is selected to reflect a basic operation of the program object and to ignore details that are likely to change in the basic operation.

12. The method of claim 11 wherein the ignored details include comments, formatting and/or identifiers.

13. The method of claim 11 wherein the information selected to reflect a basic operation of the program object is a program dependency graph.

14. The method of claim 1 wherein the comparing step comprises the step of periodically comparing, at some timed interval, one or more of the documents on the system with corresponding database entries to determine what changes have occurred since a last examination.

15. The method of claim 1 wherein the comparing step comprises the step of comparing, in response to an event, to determine what changes have occurred in the recent past.

16. The method of claim 15 wherein the event includes receipt of a user input.

17. The method of claim 15 wherein the event includes every occurrence of a document changing.

18. The method of claim 15 wherein the event includes every Nth occurrence of a document changing, for some value of N.

19. The method of claim 15 wherein the event includes an Nth occurrence of any document changing, for some value of N.

20. The method of claim 1 wherein the comparing step comprises the step of comparing each of the one or more documents with corresponding database entries to detect added program objects.

21. The method of claim 4 wherein the using step comprises the step of determining one or more sets of program objects which are suspected of being viral.

22. The method of claim 21 wherein the determining step comprises the step of determining a positive maximum set of program object names which have been added to a number of documents.

23. The method of claim 1 wherein the using step further comprises the steps of:

warning a user of the document changes; and receiving a message from the user indicating action to be taken.

24. The method of claim 1 wherein the set of dynamic heuristic criteria includes whether more than a predetermined minimum number of documents have changed from having no program objects to having some program objects.

25. The method of claim 1 wherein the set of dynamic heuristic criteria includes whether more than a predetermined minimum number of documents have had the same number of units of active content added to them.

26. The method of claim 1 wherein the maintaining step comprises the step of maintaining a database of information about each of the documents sufficient to determine which program objects are new, and wherein the set of dynamic heuristic criteria includes whether more than a predetermined minimum number of documents have had new units of active content with the same name added to them.

27. The method of claim 1 further comprising the step of restoring, for certain types of document changes, the changed documents to their original condition or to a functionally equivalent state.

28. The method of claim 27 wherein the restoring step comprises the step of removing all program objects from documents that previously contained none.

29. The method of claim 27 wherein the restoring step comprises the step of removing all program objects that were not previously present, according to the information stored in the database.

30. The method of claim 21 further comprising the step of restoring, for certain types of document changes, the changed documents to their original condition or to a functionally equivalent state by removing from each changed document any and all program objects that are suspected of being viral, in response to the using step.

31. The method of claim 1 further comprising the step of updating the database where any of the one or more documents does not have a corresponding database entry.

32. The method of claim 1 further comprising the step of recording, in the database, any new program object which has been added to any of the documents.

33. The method of claim 1 further comprising the step of recording, in the database, only those changes to documents which are judged not to be possibly viral in nature, so that future executions of the method will detect the other changes again and again consider whether or not they represent viral changes, in the light of other changes that have occurred since.

34. The method of claim 1 further comprising the step of recording, in an additional database, information about recent program changes and utilizing, in the using step, the information in addition to any changes detected in a current run.

35. A program storage device, readable by a machine, tangibly embodying a program of instructions executable by the machine to perform method steps for detecting document-infecting computer viruses by utilizing dynamic heuristics in a computer system having a plurality of documents, said method steps comprising:

maintaining a database of information pertaining to program objects associated with one or more of the documents;

comparing associated program object information of each of the documents on the system with corresponding program object information maintained in database entries in the database to detect certain document changes; and using a set of dynamic heuristic criteria to determine whether or not the detected document changes are likely to have been caused by viral activity.

36. A system for detecting document-infecting computer viruses by utilizing dynamic heuristics in a computer system having a plurality of documents, the system comprising:

means for maintaining a database of information pertaining to program objects associated with one or more of the documents;

means for comparing associated program object information of each of the documents on the system with corresponding program object information maintained in database entries in the database to detect certain document changes; and means for using a set of dynamic heuristic criteria to determine whether or not the detected document changes are likely to have been caused by viral activity.

37. The system of claim 36 wherein the program objects include macros or programs.

38. The system of claim 36 wherein the maintaining means comprises means for maintaining a database of information about whether or not each of the documents contains any program objects.

39. The system of claim 36 wherein the maintaining means comprises means for maintaining a database of information about each of the documents including the name of each program object contained in each of the documents.

40. The system of claim 36 wherein the maintaining means comprises means for maintaining a database of information about each of the documents including a number of the program objects contained in each of the documents.

41. The system of claim 36 wherein the maintaining means comprises means for maintaining a database of information about each of the documents including a combined total length of the program objects contained in each of the documents.

42. The system of claim 36 wherein the maintaining means comprises means for maintaining a database of information about each of the documents including a length of each program object contained in each of the documents.

43. The system of claim 36 wherein the maintaining means comprises means for maintaining a database of information about each of the documents including a CRC or other checksum of each program object contained in each of the documents.

44. The system of claim 36 wherein the maintaining means comprises means for maintaining actual content of each program object located in each document.

45. The system of claim 36 wherein the information pertaining to each program object includes a transformation of its actual content that is likely to be invariant or insensitive to typical types of polymorphism.

46. The system of claim 36 wherein the information pertaining to each program object is selected to reflect a basic operation of the program object and to ignore details that are likely to change in the basic operation.

47. The system of claim 46 wherein the ignored details include comments, formatting and/or identifiers.

48. The system of claim 46 wherein the information selected to reflect a basic operation of the program object is a program dependency graph.

49. The system of claim 36 wherein the comparing means comprises means for periodically comparing, at some timed interval, one or more of the documents on the system with corresponding database entries to determine what changes have occurred since a last examination.

50. The system of claim 36 wherein the comparing means comprises means for comparing, in response to an event, to determine what changes have occurred in the recent past.

51. The system of claim 50 wherein the event includes receipt of a user input.

52. The system of claim 50 wherein the event includes every occurrence of a document changing.

53. The system of claim 50 wherein the event includes every Nth occurrence of a document changing, for some value of N.

54. The system of claim 50 wherein the event includes an Nth occurrence of any document changing, for some value of N.

55. The system of claim 36 wherein the comparing means comprises means for comparing each of the one or more documents with corresponding database entries to detect added program objects.

56. The system of claim 36 wherein the using means comprises means for determining one or more sets of program objects which are suspected of being viral.

57. The system of claim 56 wherein the one or more sets of program objects comprises a positive maximum set of program object names which have been added to a number of documents.

58. The system of claim 36 wherein the using means further comprises:

means for warning a user of the document changes; and
means for receiving a message from the user indicating action to be taken.

59. The system of claim 36 wherein the set of dynamic heuristic criteria includes whether more than a predetermined minimum number of documents have changed from having no program objects to having some program objects.

60. The system of claim 36 wherein the set of dynamic heuristic criteria includes whether more than a predetermined minimum number of documents have had the same number of units of active content added to them.

61. The method of claim 36 wherein the maintaining means comprises means for maintaining a database of information about each of the documents sufficient to determine which program objects are new, and wherein the set of criteria includes whether more than a predetermined minimum number of documents have had new units of active content with the same name added to them.

62. The system of claim 36 further comprising means for restoring, for certain types of document changes, the changed documents to their original condition or to a functionally equivalent state.

63. The system of claim 62 wherein the restoring means comprises means for removing all program objects from documents that previously contained none.

64. The system of claim 62 wherein the restoring means comprises means for removing all program objects that were not previously present, according to the information stored in the database.

65. The system of claim 56 further comprising means for restoring, for certain types of document changes, the changed documents to their original condition or to a functionally equivalent state, wherein the restoring means comprises means for removing from each changed document any and all program objects that are suspected of being viral, in response to the using step.

66. The system of claim 36 further comprising means for updating the database where any of the one or more documents does not have a corresponding database entry.

67. The system of claim 36 further comprising means for recording, in the database, any new program object which has been added to any of the documents.

68. The system of claim 36 further comprising means for recording, in the database, only those changes to documents which are judged not to be possibly viral in nature, so that future executions of the system will detect the other changes again, and again consider whether or not they represent viral changes, in light of other changes that have occurred since.

69. The system of claim 36 further comprising means for recording, in an additional database, information about recent program changes, wherein the using means utilizes the information, in addition to any changes detected in a current run.

* * * * *